United States Patent [19]
Ashton et al.

[11] 3,808,396
[45] Apr. 30, 1974

[54] FIXED-DAM, VERTICAL-UP, OPEN-ARC WELDING

[75] Inventors: Theodore Ashton, Lyndhurst; Ralph M. Samodell, Cleveland Heights, both of Ohio

[73] Assignee: The Lincoln Electric Company, Cleveland, Ohio

[22] Filed: Sept. 11, 1972

[21] Appl. No.: 287,813

[52] U.S. Cl. ............... 219/126, 219/74, 219/137, 219/146
[51] Int. Cl. ............................................ B23k 9/12
[58] Field of Search ........ 219/126, 73, 74, 137, 146

[56] References Cited
UNITED STATES PATENTS

| | | | |
|---|---|---|---|
| 3,646,312 | 2/1972 | Cable et al. | 219/146 |
| 3,612,817 | 10/1971 | Tichelaar et al. | 219/126 |
| 3,296,412 | 1/1967 | Waite et al. | 219/126 |
| 2,868,951 | 1/1959 | Shrubsall | 219/74 |
| 3,337,712 | 8/1967 | Lucey | 219/136 |

Primary Examiner—C. L. Albritton
Attorney, Agent, or Firm—Meyer, Tilberry & Body

[57] ABSTRACT

A method of vertical-up welding using fixed dams to hold the molten metal in position until hardened wherein the electrode is fed to the weld pool through an electrically energized consumable nozzle positioned in the well formed by the dams and the edges to be welded. The electrode is of the cored type containing the arc shielding and slagging materials on the inside. The amount of slagging material is so limited as to insure an open arc. The arc current, the arc voltage, the electrode diameter and the spacing between the edges to be welded are all so interrelated that the total heat input to the weld is between 300,000 and 650,000 Joules per linear inch of weld per inch of plate thickness for the smaller plate thicknesses and a fixed electrode and up to 750,000 Joules for thicker plate thicknesses and an oscillating electrode. Very high lineal weld speeds result with sound weld beads.

9 Claims, 3 Drawing Figures

FIXED-DAM, VERTICAL-UP, OPEN-ARC WELDING

The present invention relates to the art of vertical-up, fixed-dam, arc welding and more particularly to such welding using a consumable nozzle for guiding the electrode to the weld pool.

The invention is in some respects an improvement on or uses the techniques of the processes described in co-pending application Ser. No. 218,487, filed Jan. 17, 1972. Additionally the invention preferably employs an electrode of the type described in co-pending application Ser. No. 216,233, filed Jan. 7, 1972. Both applications are assigned to the assingee of this application. The disclosures of these applications are incorporated herein by reference.

It is conventional today to weld the edges of heavy steel plates by positioning them in vertically extending, horizontally spaced parallel relationship, bridging the gaps by means of a pair of fixed copper dams to form an upwardly opening well. An electrically energized, consumable-electrode nozzle is positioned in the well in insulated relationship to the sides thereof and a solid steel consumable electrode is fed through the nozzle into a deep pool (e.g., 1–4 inches) of molten slag on top of a pool of molten, but cooling, weld metal. The conduction of the current through the slag heats the slag to provide sufficient heat to melt the nozzle, the electrode and the workpiece edges. There is no arc involved in this welding process. It is familiarly known as the electro-slag process.

One of the principal difficulties with such a process heretofore has been the slow linear welding speeds, i.e., 1.2 inches per minute for a 1 inch plate and in obtaining weld beads which had the required physicals.

As a result of the present invention, it has been determined that by severely limiting the depth of the slag over the weld pool such that an open arc always exists through the slag to the molten weld metal and by otherwise carefully controlling the interrelationships that exist between the mechanical, electrical parameters, it is possible to substantially increase the lineal welding speed; e.g., to 4.1 inches per minute for a 1 inch plate, and obtain a proper thermal history of the weld bead.

Thus, in accordance with the present invention a process of vertical-up, fixed-dam welding of the edges of steel plates is provided wherein the electrode is fed to the weld pool through an electrically energized, consumable nozzle while simultaneously feeding suitable slag-producing materials to the vicinity of the arc in such amounts that, considering the loss or useage of the flux as the weld progresses, an open arc is continuously maintained.

Further, since the nozzle is raised to its melting temperature by radiated and convected heat and by the welding current it must carry, the electrode fed through it is preheated before it emerges from the nozzle and a very high melt-off rate results. It is to be noted that the major amount of arcing takes place between the weld pool and the end of the electrode which extends 0.5 to 1.5 inches from the end of the nozzle although there are arcs to the nozzle sides when molten slag is spattered up between the nozzle and the plate.

Additionally, the electrode diameter, the electrode feed speed, the arc voltage and the edge spacing are all so interrelated that the energy input to the weld is between 300,000 to 650,000 Joules per inch of weld per inch of plate thickness (J/i/i) for plates 1½ inches and under in thickness and up to 750,000 J/i/i for plates over 1½ inches in thickness.

The principal object of the invention is the provision of a new and improved method of vertical-up, fixed-dam, consumable-nozzle welding which provides higher lineal speeds of welding than ever heretofore obtainable.

Another object of the invention is the provision of a new and improved method of fixed-dam, vertical-up, consumable-nozzle welding wherein an open arc is always maintained.

Another object of the invention is the provisions of a new and improved process of vertical-up, fixed-dam, consumable-nozzle welding wherein the amount of flux fed to the arc is controlled considering the useage of flux in the process such that the slag on the weld pool surface never becomes deep enough to snuff out the arc.

Another object of the invention is the provision of a new and improved method of fixed-dam, vertical-up, consumable nozzle welding wherein sound weld beads may be obtained at maximum possible lineal weld speeds.

Another object of the invention is a process of vertical-up, fixed-dam, consumable-nozzle welding wherein the welding parameters are such that the weld bead has a thermal history conducive to good physicals.

Still another object of the invention is the provision of a new and improved process of fixed-dam, vertical-up, consumable-nozzle welding wherein the lineal weld speeds for a 1 inch plate can be in excess of four inches per minute.

The invention may take physical form in certain steps and combinations of steps, preferred embodiments of which will be described in detail in this specification. Apparatus for carrying out such process is described in the accompanying drawings which are a part hereof and wherein.

Figure 1:
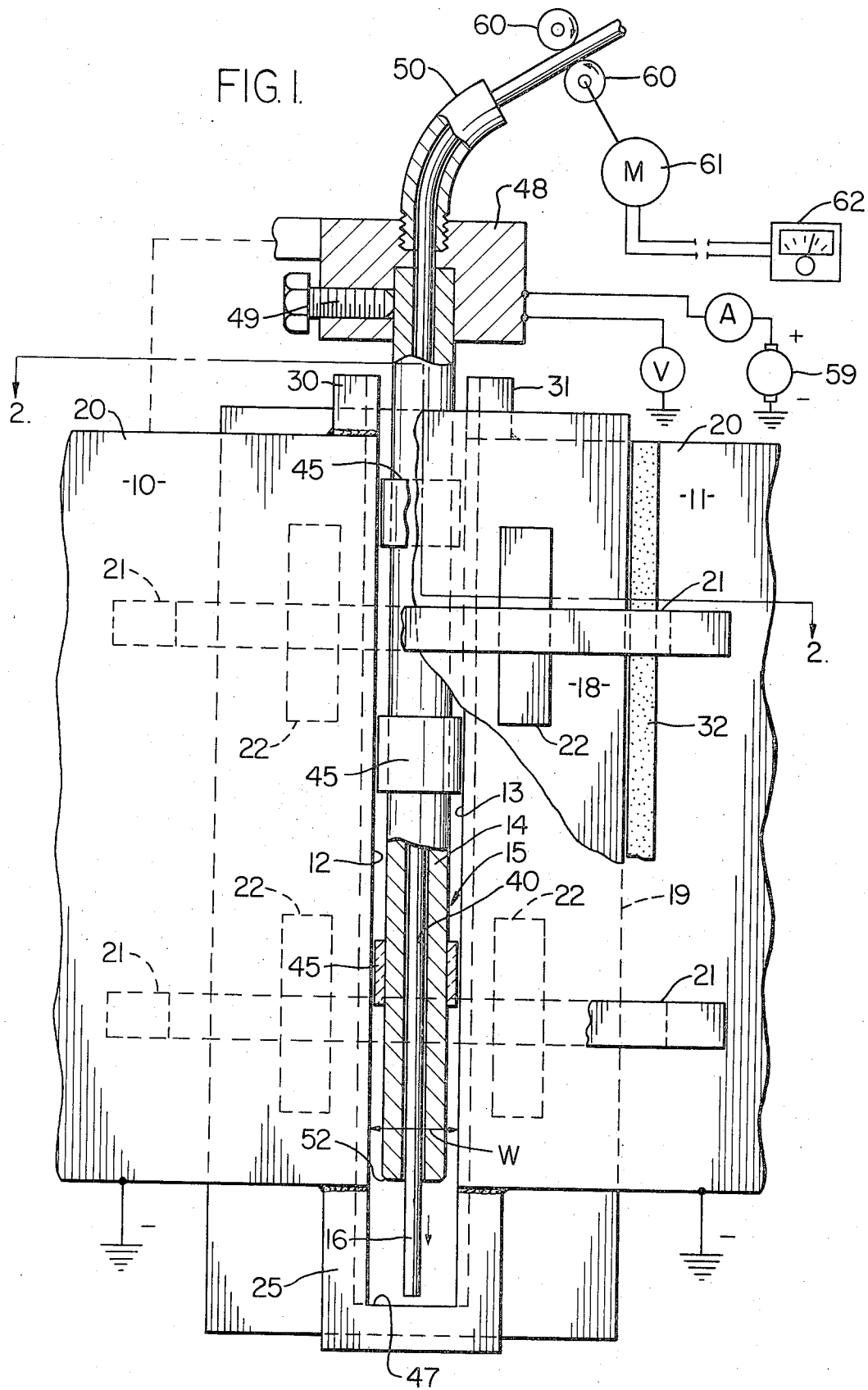
FIG. 1 is a side elevational view with portions partly removed illustrating an arrangement for carrying out the present invention.
Figure 2:
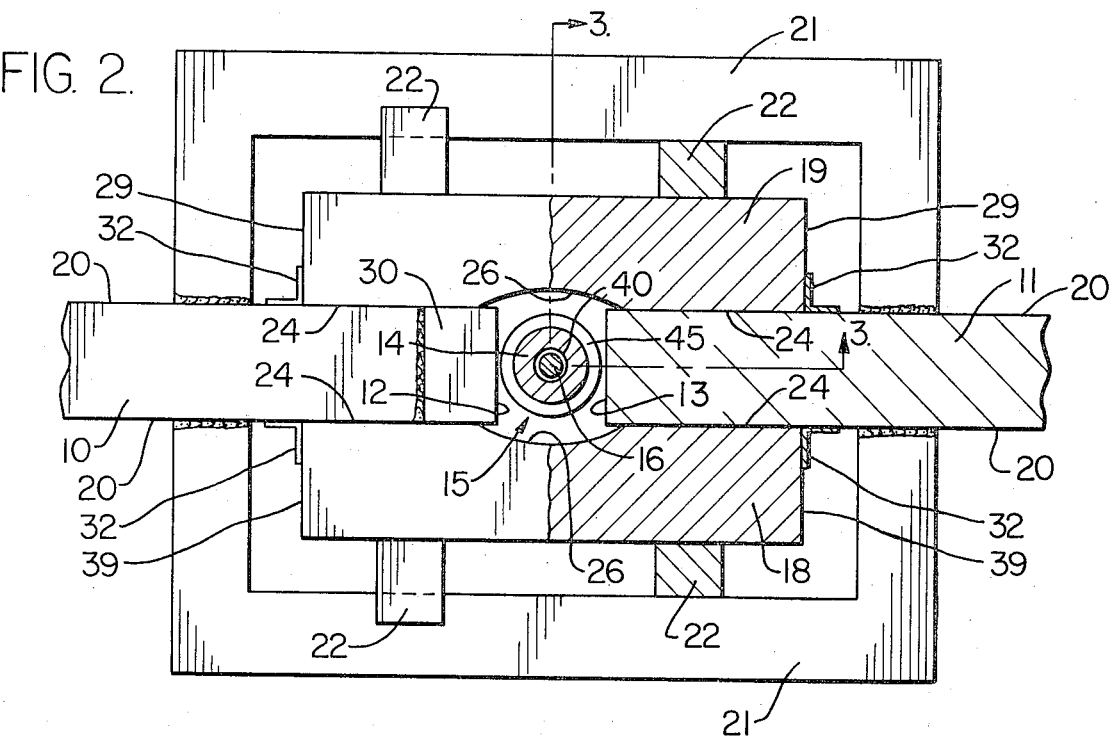
FIG. 2 is a cross-sectional view of FIG. 1 taken approximately on the line 2—2 thereof.
Figure 3:
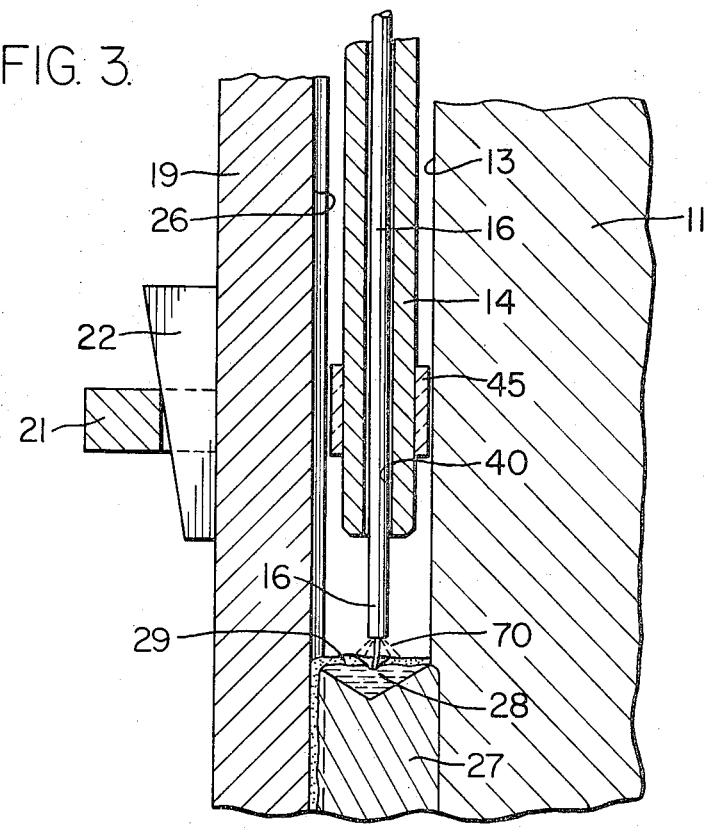
FIG. 3 is a fragmentary cross-sectional view of FIG. 2 taken on the line 3—3 thereof showing the welding in process.

Referring now to the drawings wherein the showings are for the purpose of illustrating a preferred embodiment of the arrangement for carrying out the invention and not for the purposes of limiting same, FIG. 1 shows a pair of metal plates 10, 11 having edges 12, 13 in generally horizontally spaced, generally parallel relationship with the long dimension extending generally vertical. The edges 12, 13 define a space into which weld metal is to be deposited from an electrically energized electrode 16 and a consumable-electrode nozzle 14. Bridging the space are a pair of copper dams 18, 19 which are held firmly against the sides of the sides 20 of the plates 10, 11 by any suitable pressure means such as a plurality of brackets 21 tack welded to the sides 20 and wedges 22.

The plates 10, 11 may be of any weldable material, but preferrably are steel having the usual amounts of silicon, manganese, and carbon as major alloying ingredients and minor amounts of other known alloying ingredients. The plates 10, 11 may be of any thickness with the usual thickness being greater than ½ inch. The gap width W may be as desired, but is preferrably beetween ¾ and ⅞ inches. Greater widths consume too much electrode, and slow down the welding and require so much heat as to make attaining the desired low rate of heat input to the weld difficult.

The dams 18, 19 have surfaces 24 in sealing engagement with the sides 20 which surfaces in accordance with normal practice have a recess 26 of a width slightly greater than the width of the gap 15. The dams 18, 19 are preferably made of copper and may be water cooled.

The surfaces of the recess 26 and the edges 12, 13 define a well 15 into which the electrode 16 and the nozzle 14 extend. The bottom of this well 15, before the welding is commenced, is usually closed by a U-bracket 25 welded to the lower edge of the plates 10, 11 and bridging the space between the edges. After the welding operation is commenced, well 15 is filled with solidified weld metal 27 on top of which there is a pool of molten metal 28 with a thin layer of slag 29 thereover.

The bracket 25 and the dams 18, 19 form a sump at the bottom of the gap 15 where the welding is commenced. The width of the opening in the bracket is usually the same as the gap width and its depth should be equal to at least the plate thickness plus ¼ of an inch. The upper ends of the legs of the bracket 25 are welded to the bottom of the plates 10 and 11. The faces of the plate and the bracket 25 must be flush so that the dams can fit up tightly and seal the lower end of the well.

Risers 30, 31 are attached to the top of each plate on each side of the gap. The thickness of these risers is equal to the plate thickness and the height should be roughly equal to the plate thickness plus ½ inch. These risers are welded in place such that both faces of the plate are flush so that the copper dams can be positioned properly and fit up tight.

Suitable sealing means such as glass tape 32, with pressure-sensitive adhesive, is usually provided to insure sealing the bottom of the well 15 and also the adjoining edges 39 of the dams 18, 19 and plate surfaces 20. Such tape prevents aspiration of air into the well.

The width W of the weld gap may be as desired but preferably is kept small enough that the heat input to the weld bead is between 300,000 to 650,000 J/i/i for plates 1½ inches and under thick and up to 750,000 J/i/i for plates over 1½ inches thick. In the preferred embodiment for plate thicknesses 1½ inches and under, where the welding can be done with a fixed nozzle, the gap width is preferably ¾ of an inch. For greater plate thicknesses, i.e., from 2 to 4 inches, the electrode nozzle is preferably oscillated in a direction parallel to the width of the plate edges, and the gap width is preferably ⅞ of an inch. In most instances, the gap width should be approximately ⅛ of an inch wider at the top than at the bottom to allow for shrinkage.

The electrode 16 in the preferred embodiment, is in the form of a mild steel tube having both fluxing or slag-forming ingredients and gas-producing ingredients on the inside thereof. The preferred electrode is described and claimed in co-pending application Ser. No. 216,233 referred to hereinabove. The important part of the electrode is that the amount of slag-producing materials per pound of electrode must be so limited that a molten slag layer does not build up to a thickness such that the arc cannot penetrate therethrough to the surface of the molten weld metal. If the arc cannot penetrate, it would be snuffed out and the process would then change from the open-arc process of the invention to a process similar to the electro-slag process which, as hereinbefore noted, provides a much slower lineal speed of welding.

In the event that the electrode produces an excessive amount of flux, it is possible to provide drain holes through the copper dams or recess geometry which will accommodate the excess slag.

It is to be noted that as the welding progresses, the molten slag congeals in the recess 26 and thus is, in effect, consumed furing the welding process. After the welding process is completed and the dams have been removed, this congealed or hardened slag can then be removed.

It is believed that during welding some of the molten slag under the arc force splashes onto and coats the lower end of the nozzle 14 as it melts off.

The electrode also preferably contains one or more ingredients which break down in the heat of the arc to produce a gas to aid in shielding the arc and weld pool from the atmosphere. Sodium fluosilicate ($Na_2SiF_6$) or potassium fluosilicate ($K_2SiF_6$) is preferred. Such compounds break down to form silicon tetrafluoride, a gas, and either sodium or potassium fluoride (a liquid at or just below the melting temperature of steel) which tends to protect the molten metal as it transfers across the arc and then becomes part of the slag. The shielding media produced tends to purge any undesirable gases from the weld pool and also protects the lower end of the nozzle 14 as it is consumed.

The nozzle 14 is in the form of an elongated, thick-walled tube having a central, axially extending passage 40 through which the electrode 16 may be moved downwardly in sliding electrical contact with the walls thereof. Electric current passes mainly through the nozzle 14 to the exit thereof.

The nozzle may be of any desired material which it is desired to have in the final deposited weld bead. Thus, if an alloy weld bead is required it is possible to form the nozzle 14 of an alloy steel. In the preferred embodiment however, and for welding mild steel plates, the nozzle is of low carbon steel. For a ¾ inch gap width, the nozzle has an outer diameter of ½ inch which will nominally leave a clearance of ⅛ inch between the outer walls of the nozzle and the edges 12, 13. The diameter of the passage 40 may be as desired, but should be sufficient to easily pass the electrode 16. In the preferred embodiment, the electrode has an outer diameter of 0.120 inches and the passage 40 has a dimaeter of 0.130 ± 0.005 inches.

For fixed nozzle operation, the nozzle 14 is intended to be exactly aligned within the well 15 over its entire length. To insure such alignment, a plurality of bands 45 of electrical insulating material are placed around the outside of the nozzle 14 at spaced points along its length. These bands are preferably of an asbestos-like material which will fuse in the heat of the arc and be disposed of in the slag. It should be noted however, that these bands are not required for any purpose other than to insure the proper location of the nozzle.

The nozzle 14 is suspended in the well 15 from an electrically energized contact block 48 having a bore in its lower surface of a diameter to just receive the upper end of the nozzle 14. A set screw 49 threaded in the block 48 then retains the upper end of the nozzle 14 in this bore. The contact block 48 is connected to one terminal of an electrical power source 59. In a like manner, both plates 10, 11 generally at their lower edges are connected to the other terminal of the power source.

The power source 59 is preferably of the constant voltage type and must have a current rating suitable for the welding.

The upper surface of the contact block 48 has a bore therein to receive the lower end of an electrode guide tube 50 having a passage aligned with the passage 40 in nozzle 14. The electrode 16 thus enters the nozzle 14 with a slight curvature so that as the electrode 16 passes through the passage 40 of the nozzle 14, it is in constant frictional and electrical contact with the walls thereof. The contact block 48 may be supported in its position in any desired manner; preferably a fixture which forms no part of th present invention is employed which enables the block 48 to be moved universally relative to the length of the well 15, so that the electrode nozzle 14 can be accurately positioned within the well 15.

The length of the nozzle 14 should be such that the lower end of the nzzle 14 will be spaced a distance approximately 2 inches above the inner, upper surface 47 of the U-shaped bracket 25 and the electrode 16 will thus have a stickout from the lower end of the nozzle 14 of approximately 2 inches when it first contacts the surface of the bracket 25 and the arc is struck and the welding started. Preferably, the lower end of the nozzle 14 is chamfered as at 52 and the upper entrance to the passage 40 should be de-burred.

For greater widths of plate where the nozzle must be oscillated during the weld, it is preferred that the length of the nozzle 14 be such that its lwoer end is spaced a distance of approximately 3 inches from the inner upper surface of the U-shaped bracket 25.

The length of the dams 18, 19 are such that they extend substantially to the lower surface of the U-shaped bracket 25 and to a point above the upper edges of the plates 10, 11 and preferably to the upper surfaces of the risers 30, 31.

The electrode is pushed through the electrode nozzle 14 by means of conventional drive rollers 60 driven by an electric motor 61, the speed of which can be set to any predetermined value by means of a speed control 62. In normal operation, the speed control 62 is set to advance the electrode 16 at a predetermined speed and this speed then determines the welding current. Once the welding operation has started, further adjustments are unnecessary.

In operation, the plates 10, 11 are positioned with their edges 12, 13 in horizontally spaced, generally vertically extending relationship. Preferably the plates are absolutely vertical, but it is possible within limits to have them at an angle other than vertical. The clamping brackets 21, U-shaped bracket 25 and the risers 30, 31 are then welded in place. the electrode nozzle 14 with the electrode 16 sticking out a short distance therebelow is positioned in the gap 15 and accurately aligned so as to be an equal distance from the walls of the well 15 and so that the lower end is spaced approximately 2 inches from the inner, upper surface 47 of bracket 25. Thereafter, the dams 18, 19 are placed in position making sure that the edges of the recess are parallel to the edges 12, 13 of the plates. Prior to placing the dams 18, 19 glass tape is positioned in the recess of dams 18, 19 at the bottom of the U-shaped bracket 25. The dams 18, 19 are then clamped in position by the wedges 22 and the sealing means 32 are fastened in place. Such means are usually held by pressure-sensitive adhesive.

The power source 59 is then set to the desired output voltage and the wire feed speed control is set to the desired wire feed. Thereafter the wire feed motor 61 is started and the electrode 16 is driven through the nozzle 14 until it strikes the bottom of the well 15 formed by surface 47 of the U-shaped bracket 25. At this moment, the end of the electrode fuses and an arc is struck. It is to be further noted that at the moment the arc is struck, the electrode 16 has approximately a 2-inch stickout. Molten weld metal from the electrode 16 and slag-forming materials are deposited in the bottom of the well 15. As the well fills up, the lower end of the electrode 16 progressively moves upwardly. The heat generated by the welding current as it passes through the nozzle 14 and the heat radiated from the arc, melts off the electrode nozzle and this end melts back along with the rising lower end of the electrode 16. At all times, the ingredients on the inside of the electrode 16 are evolving a shielding gas or vapor which passes upwardly in the space between the sides of the well 15 and the outer surfaces of the nozzle 14, thus purging any oxygen or nitrogen or water vapor or other undesirable gases which might have been within the well. It is to be noted that since the arc area is so confined, using this process, a lesser amount of shielding gas or slag is required than would be the case in open-arc, open-seam welding.

The primary variables with the process of the invention are wire feed speed and arc voltage. The wire feed speed is set as indicated by predetermined procedures to give a desired arc current. The arc current should not be adjusted once the welding operation has commenced. For instance, immediately after striking the arc, the current will be low. As the bottom of the well fills up, the current substantially increases as the stickout of the electrode 16 from the lower end of the nozzle 14 becomes shorter. After several minutes, the end of the nozzle reaches its melting temperature and thereafter is gradually consumed. The effective stickout then increases slightly and the current drops.

The current initially will be around 900 amperes. It increases to perhaps as high as 1,200 to 1,300 amperes on thinner plates. As the nozzle 14 heats up, the current drops off and then stays approximately constant for the remainder of the weld, at the 900 ampere level. It is important to note that this steady-state value may not be reached for three or four minutes. While the arc current is high, the arc voltage will have dropped slightly due to the heavy load placed on the generator. The arc voltage should not be adjusted during this period of start up. During the entire welding operation an arc 70 is always present although it may short out momentarily when a molten droplet transfers from the electrode to the weld pool.

Porosity will sometimes be found in the portion of the weld formed by the U-shaped bracket 25. If there is excessive porosity it indicates that either the arc voltage is too high, the wire feed speed is too low or that there is contamination, probably organic, in the weld joint. When the welding conditions are set properly, there will be considerable shorting of the electrode end to the weld pool. If the arc sounds very smooth and hissing, it indicates a long arc and porosity will result. High voltage for a given wire feed speed will generally cause this problem.

As the welding progresses, the heat from the arc impinges on the edges of the plate and these edges are melted and become part of the ultimate weld bead. Incompletely fused edges of the weld are either an indication that the weld was too "cold" or that the copper dams were misaligned. Welds can be made "hotter" by raising the voltage or widening the gap slightly. If the copper dams are not placed correctly or if the groove is too narrow, one edge of the copper recess can be so close to one corner of the plate that fusion there will not occur.

On oscillated welds, incomplete edge fusion may be a result of the electrode oscillation amplitude being too short or the dwell time at either edge of the weld too short. Incomplete fusion in the center of the plate is caused by oscillating the nozzle too fast or too low an arc voltage.

If the crater of the weld "erupts" and puffs up after stopping the weld, the arc voltage is too high, the wire feed speed is too low or the weld came too close to the top of the riser. Welds should be stopped an inch or more below the top of the riser unless a reduced voltage and wire feed speed (fadeout) is employed. It is very important to monitor the arc voltage during welding and keep it constant. However, the voltage must be adjusted slowly.

To obtain satisfactory welds, normally the procedures for complete fusion of the edges and proper heat input to the weld are fist determined emperically in laboratory set-up duplicating field conditions. Thereafter, the apparatus in the field must be set up to duplicate the laboratory conditions. For a fixed electrode nozzle and for plates from ¾ inch to 1½ inches the following conditions have been determined to obtain weld beads of satisfactory quality:

TABLE A

| Plate Thickness (T) | ¾" | 1" | 1¼" | 1½" |
|---|---|---|---|---|
| Volts DC+ | 36 | 39 | 41 | 44 |
| Travel Speed "/Min. | 4.7–5.2 | 3.9–4.3 | 3.5–3.9 | 3.1–3.4 |
| Wire Feed Speed "/Min. | 300 | 330 | 360 | 390 |
| Deposition Rate lbs./hr. | 56 | 58 | 62 | 65 |

The electrode used in all examples is "NR–431" 0.120 inch diameter manufactured by The Lincoln Electric Co., The preferred electrode formulation is as follows in weight percent:

| Quartz | 0.5 |
| Potassium Silico Fluoride | 1.5 |
| Sodium Fluoride | 0.6 |
| Iron Powder (90% Fe, 4.25% FeO, 2.75% SiO$_2$, balance metal oxide impurities) | 19.4 |
| Ferro Silicon | 0.5 |
| Manganese metal | 2.5 |
| Steel Outer Shell | balance |
| Total: | 100% |

For the thicker plate thicknesses from 2 inches to 4 inches it is preferred that the electrode nozzle be oscillated in a direction parallel to the edges 12, 13 to be welded, a total distance R in accordance with the following table:

TABLE B

| Plate Thickness (T) | 2" | 3" | 4" |
|---|---|---|---|
| Volts DC+ | 42 | 43 | 44 |
| Travel Speed "/Min. | 1.6–1.8 | 1.1–1.2 | 0.3–1.0 |
| Wire Feed Speed in./Min. | 330 | 360 | 390 |
| Oscillation Track (R) in. | 1¼ | 2¼ | 3¼ |
| Oscillation Period (Sec.) | 6 | 7.5 | 10 |
| Dwell (Sec.) | 2 | 3 | 4 |
| Travel (Sec.) | 1 | 1.5 | 2 |
| Deposition Rate lb./hr. | 58 | 62 | 65 |

It is to be noted that the welding procedures set forth above for a fixed electrode nozzle are such that the total heat input to the weld is between 300,000 and 650,000 Joules per linear inch of weld per inch of plate thickness and for the oscillating electrode between 300,000 and 750,000 Joules per lineal inch of weld per inch of plate thickness, the former being generally used with plate thicknesses 1½ inches and under and the greater number with the oscillating electrode being used for plate thicknesses above 1½ inches up to 4 inches.

The parameters for determining the heat input and for obtaining such low heat input to the weld bead are all set forth in co-pending application Ser. No. 218,487; filed Jan. 17, 1972, referred to above, and need not be detailed further.

It is to be pointed out that the nozzle 14 employed in conjunction with the present invention has a substantial wall thickness and that the passage has a diameter such as to insure that the electrode will be in constant pressure sliding electrical contact with the inner walls of the tube. The tube, with its substantial wall thickness thus serves to conduct electrical current to its extreme lower end and the portion of the electrode sticking out below the lower end of the nozzle then is further heated by $I^2R$ heating such that by the time any portion of the electrode reaches the arcing end, its temperature has been substantially elevated. The arc thus must only supply enough heat to raise the arcing end of the electrode the rest of the way to the melting temperature and then supply the heat of fusion. Thus, very high rates of electrode melt-off may be obtained for a given arc current. This stickout is important. Automatic variations act to level out the current variations. If the stickout increases the current tends to drop, and if the stickout decreases, the current will increase. A point of stable operation is soon reached.

It is further to be noted that because of the wall thickness of the electrode nozzle, it is impossible to conduct shielding gas through the nozzle to the surface of the weld pool. The invention thus relies solely on shielding from solid materials on the inside of the electrode to form a gas and metal protecting slag which protects the molten metal of the electrode and nozzle from oxygen and nitrogen or other contaminating gases as the metal transfers to the molten pool. It is further important that the amount of slagging materials carried to the weld pool be sufficiently low that considering the losses of the slagging materials due to spattering or due to that which congeals against the surfaces of the copper dams there is never enough slag on the surface of the weld pool to snuff out the arc, thus changing the welding from an open arc to an electro-slag process.

Comparison of the results of the present invention indicate that lineal welding speeds never heretofore thought possible can be obtained which results in a substantially decreased cost of welding.

Such results compared with the prior art electro-slag process are as follows:

TABLE C

Invention

| Plate Thickness | Nozzle Mode | Amps | Volts | In./min. | J/i/i |
|---|---|---|---|---|---|
| ¾ | Fixed | 900 | 36 | 5 | 518,400 |
| 1 | Fixed | 900 | 39 | 4.1 | 512,460 |
| 1¼ | Fixed | 900 | 41 | 3.7 | 478,224 |
| 1½ | Fixed | 900 | 44 | 3.21 | 493,680 |
| 2 | Osc. | 850 | 42 | 1.7 | 628,320 |
| 3 | Osc. | 850 | 43 | 1.2 | 609,167 |
| 4 | Osc. | 850 | 44 | 1.0 | 561,000 |

TABLE D

Prior Art Electro Slag

| Plate Thickness | Nozzle Mode | Amps | Volts | In./min. | J/i/i |
|---|---|---|---|---|---|
| ¾ | Fixed | 500 | 35 | 1.44 | 975,333 |
| 1 | Fixed | 600 | 38 | 1.2 | 1,140,000 |
| 2 | Fixed | 700 | 29 | 1.0 | 819,000 |
| 3 | Fixed | 700 | 52 | 0.8 | 910,000 |

The invention has been described with reference to a copper dam co-acting with the plates to form a well. Obviously the well could be formed by other types of dams such as a cluster of three or more plates arranged at an angle to each other and with the plurality of edges to be welded facing and defining the well. In such instances the corner defined by the adjacent plate surfaces would have to be backed up by dams to prevent loss of weld metal when the adjacent corners of the plates melted during the welding process.

Obviously modifications and alterations will occur to others upon a reading and understanding of this specification and it is our intention to include such modifications and alterations insofar as they come within the scope of the intended claims.

Having thus described our invention, we claim:

1. A process of vertical-up, fixed-dam welding of the edges of metal plates comprising the steps of: positioning the edges of the plates to be welded in generally horizontally spaced, generally vertically extending relationship; positioning a consumable metal nozzle in said space; bridging the space with dams to provide a generally vertically extending well; electrically energizing said nozzle relative to said plates; advancing a tubular electrode through said nozzle to the bottom of the well; said electrode having on the inside solid materials which in the heat of an electric arc form both slagging and gaseous ingredients, establishing and maintaining an electric arc between the end of the electrode and a molten weld pool whereby both gaseous and slagging ingredients are continuously produced, said gas ingredients continuously purging said well and maintaining the thickness of the slagging ingredients on the weld pool in sufficiently small amounts that an open arc is continuously maintained between the lower end of the electrode and the molten weld pool.

2. The process of claim 1 wherein the electrode feed speed, the arc voltage, and the gap width are all so interrelated that the total heat input to the gap is between 300,000 and 750,000 Joules per inch of weld per inch of plate thickness.

3. The method of claim 2 wherein said nozzle is oscillated in a direction parallel to the width of the plate edges.

4. The method of claim 2 wherein said nozzle is stationary relative to the width of the plate edges and the total heat input is between 300,000 and 650,000 Joules per lineal inch of weld per inch of plate thickness.

5. In a vertical-up, fixed-dam welding process using a consumable nozzle, the improvement which comprises: advancing a tubular electrode through said nozzle to the weld pool, said electrode containing on the inside materials capable of breaking down in the heat of the arc to produce a shielding gas to protect the molten metal of the electrode and nozzle from the atmosphere, said electrode also containing on the inside materials which melt or combine in the heat of the arc to produce a slagging ingredient, the amount of slag forming ingredients on the inside of said electrode being insufficient to form a layer of molten flux on the weld pool thick enough to snuff out the electric arc.

6. In a method of vertical-up, fixed-dam, consumable-nozzle welding wherein the edges of the plate to be welded and dams provide an upwardly opening well and a consumable nozzle extends generally to the bottom of the well and an electrode is fed through the nozzle in sliding electrical contact therwith to the bottom of the well, the improvement which comprises: energizing said nozzle with a voltage such that an open arc is maintained between the end of the electrode and the bottom of the well, said electrode being tubular and containing on the inside slag forming and gas-producing materials, whereby molten metal and slagging materials are continuously deposited at the bottom of the well with the slagging materials floating on top and maintaining the amount of slagging materials as the weld progresses to a depth insufficient to extinguish the electric arc.

7. In a method of vertical-up, fixed dam, consumable nozzle welding wherein the edges of the plates to be welded and dams provide an upwardly opening well and an electrically energized consumable nozzle extends generally toward the bottom of the well, the improvement which comprises advancing a tubular electrode through said nozzle in electrical contact therewith, establishing an open electric arc between the end of the electrode and the bottom of the well to form a molten weld pool, said electrode containing on the inside gas producing and slag producing materials whereby a gas is continuously evolved at the arc and a molten layer of slag is deposited on the surface of the weld pool and maintaining the thickness of the slag such that an open arc between the end of said electrode and the molten weld pool exists at all times as the weld progresses.

8. The improvement of claim 7 wherein the gap width, plate thickness, arc voltage and electrode feed speed are so adjusted that the heat input to the weld is between 300,000 and 650,000 Joules per inch of weld per inch of plate thickness.

9. The improvement of claim 7 wherein the electrode nozzle is oscillated in a direction parallel to the width of the edges and interrelating the plate thickness, gap width, arc voltage and electrode feed speed that the heat input to the weld is between 300,000 and 750,000 Joules per lineal inch of weld per lineal inch of plate thickness.

* * * * *